(12) United States Patent
Gao et al.

(10) Patent No.: US 9,501,186 B2
(45) Date of Patent: Nov. 22, 2016

(54) TOUCH SCREEN AND MOBILE TERMINAL INCLUDING SAME

(71) Applicant: Xiaomi Inc., Beijing (CN)

(72) Inventors: Yuan Gao, Beijing (CN); Xiaohui Pi, Beijing (CN); Xiaogang Jiao, Beijing (CN)

(73) Assignee: Xiaomi Inc., Beijing (CN)

( * ) Notice: Subject to any disclaimer, the term of this patent is extended or adjusted under 35 U.S.C. 154(b) by 181 days.

(21) Appl. No.: 14/271,613

(22) Filed: May 7, 2014

(65) Prior Publication Data

US 2015/0015804 A1 Jan. 15, 2015

Related U.S. Application Data

(63) Continuation of application No. PCT/CN2014/072271, filed on Feb. 19, 2014.

(30) Foreign Application Priority Data

Jul. 12, 2013 (CN) .......................... 2013 1 0293734

(51) Int. Cl.
*G06F 3/044* (2006.01)

(52) U.S. Cl.
CPC .................................... *G06F 3/044* (2013.01)

(58) Field of Classification Search
CPC combination set(s) only.
See application file for complete search history.

(56) References Cited

U.S. PATENT DOCUMENTS

| | | | |
|---|---|---|---|
| 6,002,389 A * | 12/1999 | Kasser | G06F 3/041 178/18.01 |
| 7,165,323 B2 | 1/2007 | Halsey et al. | |
| 7,574,794 B2 | 8/2009 | Halsey et al. | |
| 8,243,418 B2 | 8/2012 | Halsey et al. | |
| 8,259,079 B2 * | 9/2012 | Watanabe | G06F 3/041 345/173 |
| 2004/0004605 A1 * | 1/2004 | David | B32B 17/064 345/173 |
| 2005/0037184 A1 | 2/2005 | Halsey et al. | |
| 2007/0122542 A1 | 5/2007 | Halsey et al. | |
| 2008/0122793 A1 * | 5/2008 | Watanabe | G06F 3/045 345/173 |
| 2009/0262092 A1 | 10/2009 | Halsey et al. | |
| 2010/0026659 A1 | 2/2010 | Long et al. | |
| 2014/0085253 A1 * | 3/2014 | Leung | G06F 3/0414 345/174 |
| 2015/0002447 A1 * | 1/2015 | Schediwy | G06F 3/044 345/174 |

FOREIGN PATENT DOCUMENTS

| | | |
|---|---|---|
| CN | 201673491 | 12/2010 |
| CN | 102331894 | 1/2012 |
| CN | 202443452 | 9/2012 |
| CN | 102819372 | 12/2012 |
| CN | 103383615 | 11/2013 |

OTHER PUBLICATIONS

International Search Report of PCT/CN2014/072271, mailed from the State Intellectual Property Office of China on Apr. 30, 2014.

* cited by examiner

*Primary Examiner* — Van Chow
(74) *Attorney, Agent, or Firm* — Finnegan, Henderson, Farabow, Garrett & Dunner LLP

(57) ABSTRACT

A touch screen, including: at least two cover glasses; a flexible film; a coating layer coating the flexible film; a transparent bonding layer bonding the flexible film that is coated with the coating layer to the at least two cover glasses; and a flexible printed circuit board electrically connected to the coating layer.

18 Claims, 5 Drawing Sheets

TOUCH SCREEN AND MOBILE TERMINAL INCLUDING SAME

CROSS-REFERENCE TO RELATED APPLICATIONS

This application is a Continuation of International Application No. PCT/CN2014/072271, filed Feb. 19, 2014, which claims priority from Chinese Patent Application No. 201310293734.9, filed Jul. 12, 2013, the entire contents of all of which are incorporated herein by reference.

TECHNICAL FIELD

The present disclosure generally relates to the field of smart terminals, and more particularly, to a touch screen and a mobile terminal including the touch screen.

BACKGROUND

A touch screen, also referred to as a touch control screen or a touch control panel, is an induction type liquid crystal display device that can receive input by fingers. Conventionally, the touch screen mainly includes two categories: resistive touch screen and capacitive touch screen.

The capacitive touch screen operates by means of current induction of a human body. The capacitive touch screen mainly consists of a glass protection layer, a conductive layer, and a display screen. The conductive layer is generally considered a crucial part of the entire touch screen, and mainly includes a glass substrate and an indium tin oxide (ITO) film coating thereon.

Most capacitive touch screens are of planar design. However, to satisfy the requirements for industrial appearance design of electronic products, a small number of three-dimensional (3D) designs are present currently. In the 3D designs, a touch screen is formed by splicing multiple touch screens, and each of the touch screens adopts a separate ITO film and control circuit, which results in high costs.

SUMMARY

According to a first aspect of the present disclosure, there is provided a touch screen, comprising: at least two cover glasses; a flexible film; a coating layer coating the flexible film; a transparent bonding layer bonding the flexible film that is coated with the coating layer to the at least two cover glasses; and a flexible printed circuit board electrically connected to the coating layer.

According to a second aspect of the present disclosure, there is provided a mobile terminal, comprising: a processor; and a touch screen coupled to the processor, wherein the touch screen comprises: at least two cover glasses; a flexible film; a coating layer coating the flexible film; a transparent bonding layer bonding the flexible film that is coated with the coating layer to the at least two cover glasses; and a flexible printed circuit board electrically connected to the coating layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
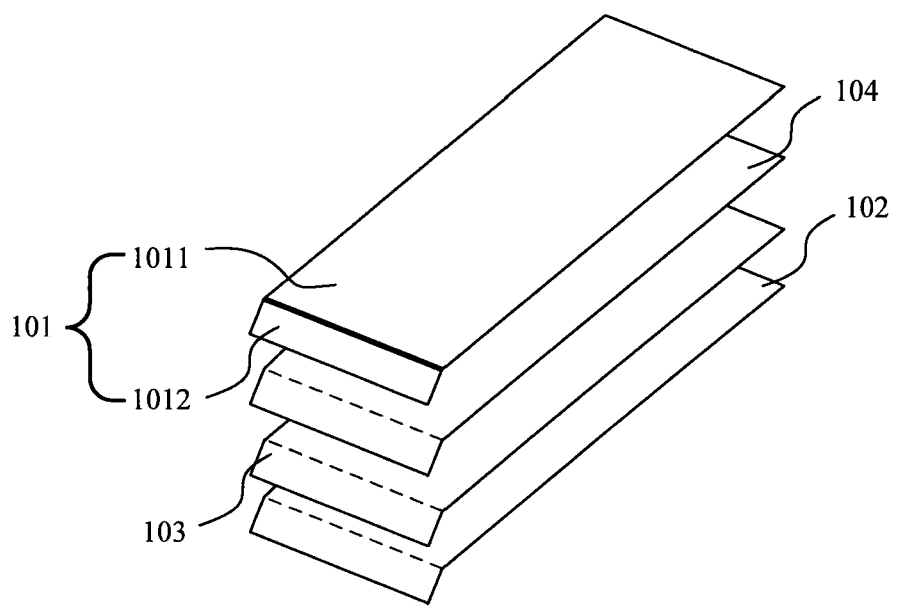
FIG. 1 is a schematic diagram of a touch screen, according to an exemplary embodiment.

FIG. 1 is a schematic diagram of a touch screen 100, according to an exemplary embodiment. Referring to FIG. 1, the touch screen 100 includes two or more cover glasses 101, a flexible film 102, an indium tin oxide (ITO) coating layer 103 coating the flexible film 102, a transparent bonding layer 104, and a flexible printed circuit (FPC) board (not shown) electrically connected to the ITO coating layer 103. For example, the cover glasses 101 may include a main cover glass 1011 and an auxiliary cover glass 1012. A side of the main cover glass 1011 is fixedly connected to a side of the auxiliary cover glass 1012, as indicated by the bold line in FIG. 1, and a surface of the main cover glass 1011 and a surface of the auxiliary cover glass 1012 form an angle therebetween. The flexible film 102 is bonded to the cover glasses 101 via the transparent bonding layer 104, and the ITO coating layer 103 is located between the flexible film 102 and the transparent bonding layer 104.

In one exemplary embodiment, the flexible film 102 is a polyester film. In the embodiment, because the ITO coating layer 103 coats the flexible film 102, and the flexible film 102 is soft and pliable, the flexible film 102 and the ITO coating layer 103 thereon may be bent according to the angle between the cover glasses 101, and cling to the cover glasses 101.

In exemplary embodiments, the ITO coating layer 103 is plated on its sides with slim electrodes. For example, the flexible film 102 may be a rectangular film. Accordingly, four slim electrodes are plated on four sides of the ITO coating layer 103, and the four electrodes are connected to a control circuit provided on the FPC board. When the touch screen 100 is touched by a finger, a coupling capacitance will be formed between the finger and the ITO coating layer 103 due to electronic charges of the human body of which the finger is a part. Currents generated from the respective electrodes will flow to the touch point, and intensities of the currents are in direct proportion to respective distances between the finger and the electrodes. The control circuit determines the intensities of the currents and a ratio thereof, thereby calculating a position of the touch point. In some embodiments, the ITO coating layer 103 may be printed with a pattern, which may be a rhombus or other shape.

In exemplary embodiments, the transparent bonding layer 104 may be an optically clear adhesive layer.

In exemplary embodiments, the touch screen 100 may further include a spacer bar (not shown), for connecting the main cover glass 1011 to the auxiliary cover glass 1012. The spacer bar may be a plastic spacer bar, a rubber spacer bar, a metal spacer bar, etc.

It should be noted that, in the illustrated embodiment, the number of cover glasses is two, including one main cover glass 1011 and one auxiliary cover glass 1012, but the number of cover glasses is not so limited, and may be set according to actual needs. In addition, the angle between the main cover glass 1011 and the auxiliary cover glass 1012 may be set according to actual needs, for example, to be 15~90 degrees.

In the illustrated embodiment, by using the flexible film 102 as a substrate for the ITO coating layer 103, and combining the two or more cover glasses 101 with an angle formed therebetween, the touch screen 100 can detect actions from the two or more cover glasses 101 by using one ITO coating layer 103 and one control circuit, thereby satisfying the need for diversification of industrial appearance design of the electronic products while reducing costs of manufacturing touch screens.

Figure 2:
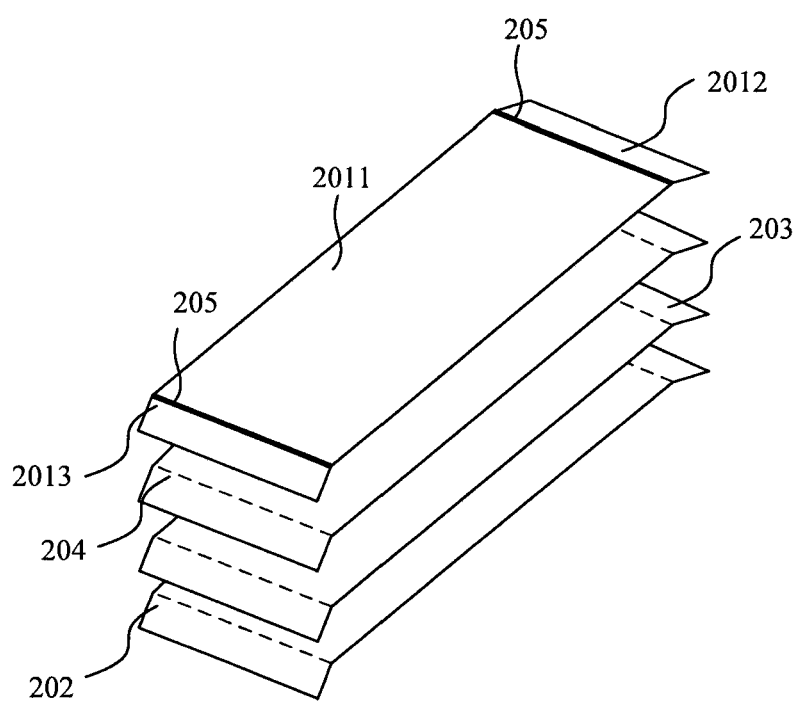
FIGS. 2-4 are a schematic diagram, a side view diagram, and a top view diagram of a touch screen, respectively, according to an exemplary embodiment.
Figure 3:
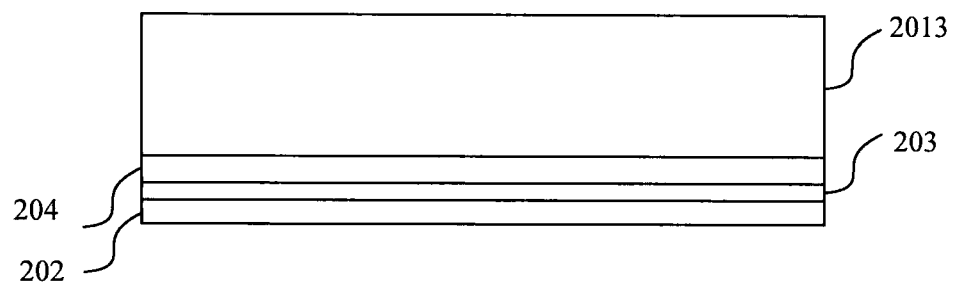
Figure 4:
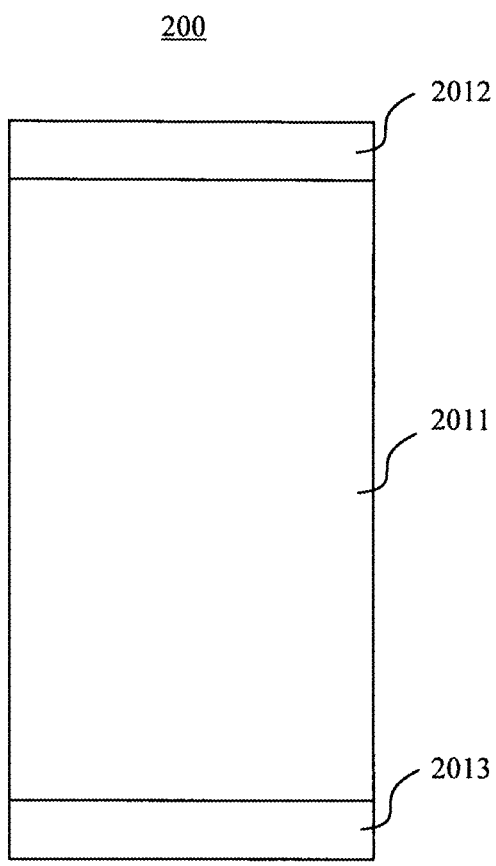

FIGS. 2-4 are a schematic structural diagram, a side view diagram, and a top view diagram of a touch screen 200, respectively, according to an exemplary embodiment. Referring to FIGS. 2-4, the touch screen 200 includes a main cover glass 2011, a first auxiliary cover glass 2012, a second auxiliary cover glass 2013, a flexible film 202, an ITO coating layer 203, a transparent bonding layer 204, and an FPC board (not shown).

In exemplary embodiments, the ITO coating layer 203 coats the flexible film 202. A first side of the main cover glass 2011 is fixedly connected to a first side of the first auxiliary cover glass 2012, and a second side, opposite to the first side, of the main cover glass 2011 is fixedly connected to a first side of the second auxiliary cover glass 2013. Moreover, a surface of the main cover glass 2011 and a surface of the first auxiliary cover glass 2012 form a first angle therebetween, and the surface of the main cover glass 2011 and a surface of the second auxiliary cover glass 2013 form a second angle therebetween. For example, the first angle may be the same as the second angle. The flexible film 202 coated with the ITO coating layer 203 is bonded to the cover glasses 2011, 2012 and 2013 via the transparent bonding layer 204. The ITO coating layer 203 is located between the flexible film 202 and the transparent bonding layer 204, and is electrically connected to the FPC board.

In one exemplary embodiment, the flexible film 202 may be a polyester film. In the embodiment, because the ITO coating layer 203 coats the flexible film 202, and the flexible film 202 is soft and pliable, the flexible film 202 and the ITO coating layer 203 thereon may be bent according to the angles between the cover glasses 2011, 2012 and 2013, and cling to the cover glasses 2011, 2012 and 2013.

In exemplary embodiments, the ITO coating layer 203 is plated on its sides with slim electrodes. For example, the flexible film 202 may be a rectangular film. Accordingly, four slim electrodes are plated on four sides of the ITO coating layer 203, and the four electrodes are connected to a control circuit provided on the FPC board. When the touch screen 200 is touched by a finger, a coupling capacitance will be formed between the finger and the ITO coating layer 203 due to electronic charges of the human body. Currents generated from the respective electrodes will flow to the touch point, and intensities of the currents are in direct proportion to respective distances between the finger and the electrodes. The control circuit determines the intensities of the currents and a ratio thereof, thereby calculating the position of the touch point. In some embodiments, the ITO coating layer 203 is printed with a pattern, which may be a rhombus or other shape.

In exemplary embodiments, the transparent bonding layer 204 may be an optically clear adhesive layer. The transparent bonding layer 204 mainly serves to bond the cover glasses 2011, 2012, and 2013 to the ITO coating layer 203.

In exemplary embodiments, the touch screen 200 may further include first and second spacer bars 205. The main cover glass 2011 is connected to the first auxiliary cover glass 2012 via the first spacer bar 205, and is connected to the second auxiliary cover glass 2013 via the second spacer bar 205. The spacer bars 205 may be plastic spacer bars, rubber spacer bars, metal spacer bars, etc.

It should be noted that, in the illustrated embodiment, the number of cover glasses is three, including one main cover glass 2011, and two auxiliary cover glasses 2012 and 2013, but the number of cover glasses is not so limited, and may be set according to actual needs. In addition, the angle between the main cover glass 2011 and each of the auxiliary cover glasses 2012 or 2013 may be set according to actual needs, for example, to be 15~90 degrees.

In the illustrated embodiment, by using the flexible film 202 as a substrate for the ITO coating layer 203, and combining the cover glasses 2011, 2012, and 2013 with angles formed therebetween, the touch screen 200 can detect actions from the cover glasses by using one ITO coating layer and one control circuit, thereby satisfying the need for diversification of industrial appearance design of electronic products while reducing costs of manufacturing touch screens.

Figure 5:
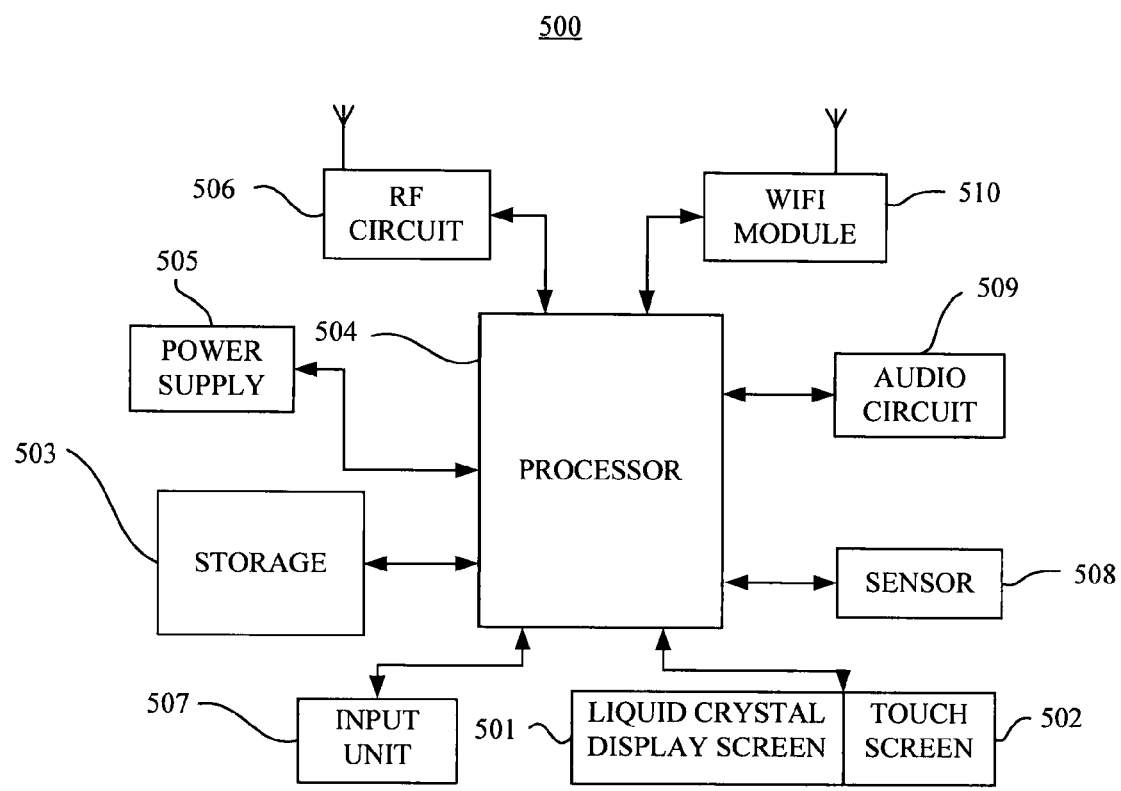
FIG. 5 is a block diagram of a mobile terminal, according to an exemplary embodiment.

FIG. 5 is a block diagram of a mobile terminal 500, according to an exemplary embodiment. Referring to FIG. 5, the mobile terminal 500 includes a liquid crystal display screen 501, a touch screen 502, a processor 504, and a housing (not shown). For example, the touch screen 502 may be the touch screen 100 (FIG. 1) or 200 (FIGS. 2-4). The touch screen 502 is fixed on the housing, and a main cover glass of the touch screen 502 covers the liquid crystal display screen 501. The processor 504 and a power supply 505 are provided within the housing, and the power supply 505 is electrically connected to the touch screen 502, the liquid crystal display screen 501, and the processor 504.

The liquid crystal display screen 501 is configured to display information input by a user, information provided to a user, and various graphic user interfaces of the mobile terminal 500. These graphic user interfaces may be constituted by graphics, texts, icons, videos, and any combinations thereof.

The power supply 505 may include a battery, and is configured to supply power to various parts, e.g., the touch screen 502, the liquid crystal display screen 501, the processor 504, etc. of the mobile terminal 500. For example, the power supply 505 can be logically connected to the processor 504 via a power supply management system, so as to achieve functions such as charging management, discharging management, and power consumption management by the power supply management system. The power supply 505 may further include one or more of a direct current (DC) power supply, an alternate current (AC) power supply, a recharging system, a power supply failure detection circuit, a power supply converter or inverter, a power supply state indicator, or any other components.

The processor 504 operates as a control center of the mobile terminal 500. For example, the processor is connected to various components of the mobile terminal 500 using various interfaces and circuitries, and performs various functions of the mobile terminal 500 and processes data so as to perform overall monitoring to the mobile terminal 500, by running or executing software programs and/or modules stored in a storage and invoking data stored in the storage. Alternatively, the processor 504 may include one or more processing cores. For example, the processor 504 may integrate an application processor and a modem processor, where the application processor mainly controls operating systems, user interfaces, and application programs, etc., and the modem processor mainly controls wireless communications.

The mobile terminal 500 may further include one or more of a storage 503, a radio frequency (RF) circuit 506, an input unit 507, a sensor 508, an audio circuit 509, and a wireless fidelity (Wi-Fi) module 510. One of ordinary skill in the art will appreciate that the mobile terminal 500 may have a structure not limited by that shown in FIG. 5. For example, the mobile terminal 500 may include more or less components than those shown in FIG. 5, or combine some of the components, or include different arrangements of the components.

In exemplary embodiments, the RF circuit 506 is configured to receive and send wireless signals during receiving and sending data. For example, after receiving downlink information from a base station, the RF circuit 506 sends the received information to the processor 504 for processing. In addition, uplink data is transmitted to the base station by the RF circuit 506. The RF circuit 506 may include an antenna, at least one amplifier, a tuner, one or more oscillators, a user identity module card, a transceiver, a coupler, a low noise amplifier (LNA), a duplexer, etc. Further, the RF circuit 506 may communicate with other devices via wireless communications and networks. The wireless communications may use any of communication standards or protocols including, e.g., Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), etc.

The storage 503 is configured to store software programs and modules. The processor 504 performs various functional applications and data processing by running the software programs and modules stored in the storage 503. The storage 503 may mainly include a program storage region and a data storage region, where the program storage region may store operating systems, application program(s) required by at least one function (e.g., audio playing function, image playing function), etc.; and the data storage region may store data (e.g., audio data, phone book, etc.) created according to the usage of the mobile terminal 500, etc. In addition, the storage 503 may include a high speed random access memory or a nonvolatile memory, such as a disk storage device or a flash memory device, or may include other volatile solid state memory. Accordingly, the storage 503 may further include a storage controller, so as to provide access to the storage 503 by the processor 504, the input unit 507 or the touch screen 502.

The input unit 507 is configured to input digital or character information, and generate signal input relating to user settings and function controls. For example, the input unit 507 may include one or more of a physical keyboard, functional keys (e.g., volume control key, switch key, etc.), a track ball, a mouse, an operation lever, etc.

The sensor 508 may include one or more of an optical sensor, a motion sensor, and other sensors. For example, the optical sensor may include an ambient light sensor and a proximity sensor. The mobile terminal 500 may be further configured with gyroscope, barometer, hygrometer, thermometer, infrared sensor, and other sensors.

The audio circuit 509 is configured to provide an audio interface between the user and the mobile terminal 500. The audio circuit 509 may convert received audio data into an electrical signal, and then convert the electrical signal into an audio signal to be output. On the other hand, the audio circuit 509 may convert a received audio signal into an electrical signal, convert the electrical signal into audio data, and then input the audio data to the processor 504 for processing. The processed audio data are transmitted to, for example, another terminal via the RF circuit 506; or the audio data may be output to the storage 503 for further processing. The audio circuit 509 may further include an earphone jack, so as to provide communication between an external earphone and the mobile terminal 500.

The WiFi module 510 is configured to provide the user with wireless wideband internet access, and may facilitate the user's receiving and sending e-mails, browsing websites, and accessing streaming media, etc.

Although not shown in FIG. 5, the mobile terminal 500 may further include a camera, a Bluetooth module, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A touch screen, comprising:
   at least two cover glasses;
   a flexible film;
   a coating layer coating the flexible film;
   a transparent bonding layer bonding the flexible film that is coated with the coating layer to the at least two cover glasses; and
   a flexible printed circuit board electrically connected to the coating layer;
   wherein the at least two cover glasses comprise:
   a main cover glass; and
   a first auxiliary cover glass;
   wherein a first side of the main cover glass is fixedly connected to a first side of the first auxiliary cover glass, and a surface of the main cover glass and a surface of the first auxiliary cover glass form a first angle therebetween.

2. The touch screen according to claim 1, wherein the coating layer is an indium tin oxide layer.

3. The touch screen according to claim 1, wherein the transparent bonding layer bonds the flexible film that is coated with the coating layer to the main cover glass and the first auxiliary cover glass, and the coating layer is located between the flexible film and the transparent bonding layer.

4. The touch screen according to claim 1, wherein the at least two cover glasses further comprise:

a second auxiliary cover glass;
wherein
a second side of the main cover glass is fixedly connected to a first side of the second auxiliary cover glass, and the surface of the main cover glass and a surface of the second auxiliary cover glass form a second angle therebetween.

5. The touch screen according to claim 1, wherein the flexible film is a polyester film.

6. The touch screen according to claim 1, wherein the transparent bonding layer is an optically clear adhesive layer.

7. The touch screen according to claim 1, further comprising:
a spacer bar for connecting the main cover glass to the first auxiliary cover glass.

8. The touch screen according to claim 7, wherein the spacer bar is one of a plastic spacer bar, a metal spacer bar, or a rubber spacer bar.

9. The touch screen according to claim 1, wherein the coating layer is plated on its four sides with electrodes, and is connected to the flexible printed circuit board through the electrodes.

10. A mobile terminal, comprising:
a processor; and
a touch screen coupled to the processor, wherein the touch screen comprises:
at least two cover glasses;
a flexible film;
a coating layer coating the flexible film;
a transparent bonding layer bonding the flexible film that is coated with the coating layer to the at least two cover glasses; and
a flexible printed circuit board electrically connected to the coating layer;
wherein the at least two cover glasses comprise:
a main cover glass; and
a first auxiliary cover glass;
wherein a first side of the main cover glass is fixedly connected to a first side of the first auxiliary cover glass, and a surface of the main cover glass and a surface of the first auxiliary cover glass form a first angle therebetween.

11. The mobile terminal according to claim 10, wherein the coating layer is an indium tin oxide layer.

12. The mobile terminal according to claim 10, wherein the transparent bonding layer bonds the flexible film that is coated with the coating layer to the main cover glass and the first auxiliary cover glass, and the coating layer is located between the flexible film and the transparent bonding layer.

13. The mobile terminal according to claim 10, wherein the at least two cover glasses further comprise:
a second auxiliary cover glass;
wherein
a second side of the main cover glass is fixedly connected to a first side of the second auxiliary cover glass, and the surface of the main cover glass and a surface of the second auxiliary cover glass form a second angle therebetween.

14. The mobile terminal according to claim 10, wherein the flexible film is a polyester film.

15. The mobile terminal according to claim 10, wherein the transparent bonding layer is an optically clear adhesive layer.

16. The mobile terminal according to claim 10, wherein the touch screen further comprises:
a spacer bar for connecting the main cover glass to the first auxiliary cover glass.

17. The mobile terminal according to claim 16, wherein the spacer bar is one of a plastic spacer bar, a metal spacer bar, or a rubber spacer bar.

18. The mobile terminal according to claim 10, wherein the coating layer is plated on its four sides with electrodes, and is connected to the flexible printed circuit board through the electrodes.

* * * * *